United States Patent
DeKeuster et al.

(10) Patent No.: US 10,177,364 B2
(45) Date of Patent: Jan. 8, 2019

(54) SYSTEM AND METHOD OF OVERMOLDED TERMINAL POSTS OF A BATTERY MODULE

(71) Applicant: Johnson Controls Technology Company, Plymouth, MI (US)

(72) Inventors: Richard M. DeKeuster, Racine, WI (US); John P. Dinkelman, South Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 254 days.

(21) Appl. No.: 15/158,321

(22) Filed: May 18, 2016

(65) Prior Publication Data
US 2017/0018755 A1    Jan. 19, 2017

Related U.S. Application Data

(60) Provisional application No. 62/193,533, filed on Jul. 16, 2015.

(51) Int. Cl.
*H01M 2/30* (2006.01)
*H01M 2/10* (2006.01)
*H01M 2/20* (2006.01)

(52) U.S. Cl.
CPC ......... *H01M 2/305* (2013.01); *H01M 2/1072* (2013.01); *H01M 2/206* (2013.01); *H01M 2220/20* (2013.01)

(58) Field of Classification Search
CPC .......... H01M 2220/20; H01M 2/1072; H01M 2/206; H01M 2/305
See application file for complete search history.

(56) References Cited

U.S. PATENT DOCUMENTS

| | | | |
|---|---|---|---|
| 2,702,829 | A | 2/1955 | Chapel |
| 3,964,934 | A | 6/1976 | Ching, Jr. et al. |
| 5,861,223 | A | 1/1999 | Motlagh |
| 6,309,429 | B1 | 10/2001 | Lund et al. |
| 6,399,239 | B2 | 6/2002 | Bolstad et al. |
| 7,192,319 | B1 | 3/2007 | Raman et al. |
| 8,328,580 | B2 | 12/2012 | Mazingue-Desailly et al. |
| 9,368,781 | B2 | 6/2016 | Harada et al. |
| 9,404,978 | B2 | 8/2016 | Unterhalt et al. |

(Continued)

FOREIGN PATENT DOCUMENTS

| | | |
|---|---|---|
| JP | 2010272324 A | 12/2010 |
| WO | 2010095224 A1 | 8/2010 |
| WO | 2013039864 | 3/2013 |

OTHER PUBLICATIONS

PCT/US2016/041677 International Search Report and Written Opinion dated Oct. 11, 2016.

*Primary Examiner* — Carlos Barcena
(74) *Attorney, Agent, or Firm* — Fletcher Yoder, P.C.

(57) ABSTRACT

A battery module includes a terminal block assembly having an electrical assembly and a plastic base. The electrical assembly includes a terminal post and a bus bar coupled with the terminal post. A portion of the electrical assembly is overmolded by the plastic base, and the portion includes at least part of a terminal post base that extends outward from a central axis of a post portion of the terminal post. The battery module also includes a plastic housing having a receptacle configured to receive the plastic base of the terminal block assembly.

23 Claims, 8 Drawing Sheets

(56) References Cited

U.S. PATENT DOCUMENTS

| | | |
|---|---|---|
| 9,419,267 B2 | 8/2016 | Uematsu |
| 2008/0293277 A1 | 11/2008 | Kumar et al. |
| 2012/0295164 A1* | 11/2012 | Nakano ............. H01M 10/0525 |
| | | 429/246 |
| 2013/0330602 A1* | 12/2013 | Tsutsumi ............... H01G 11/70 |
| | | 429/179 |
| 2014/0087246 A1 | 3/2014 | Yamamoto et al. |
| 2014/0284076 A1 | 9/2014 | Aisenbrey |
| 2015/0349315 A1 | 12/2015 | Shope et al. |
| 2016/0079027 A1 | 3/2016 | Matsumoto et al. |
| 2016/0197373 A1 | 7/2016 | Shaffer, II et al. |

\* cited by examiner

SYSTEM AND METHOD OF OVERMOLDED TERMINAL POSTS OF A BATTERY MODULE

CROSS REFERENCE TO RELATED APPLICATIONS

This application claims priority from and the benefit of U.S. Provisional Application Ser. No. 62/193,533, entitled "LASER WELDING NEG AND POS POSTS", filed Jul. 16, 2015, which is hereby incorporated by reference for all purposes.

BACKGROUND

The present disclosure relates generally to the field of batteries and battery modules. More specifically, the present disclosure relates to a system and method for integrating terminal posts of a battery module with a housing of the battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include complicated electrical coupling between electrochemical cells of the battery module and terminal posts of the battery module. The complicated electrical coupling may cause leakage of electrolyte from a housing of the battery module, or of fluids into the housing of the battery module. Accordingly, improved integration of terminal posts with (or in) a housing of the battery module is desired.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery module that includes a terminal block assembly having an electrical assembly and a plastic base. The electrical assembly includes a terminal post and a bus bar coupled with the terminal post. A portion of the electrical assembly is overmolded by the plastic base, and the portion includes at least part of a terminal post base that extends outward from a central axis of a post portion of the terminal post. The battery module also includes a plastic housing having a receptacle configured to receive the plastic base of the terminal block assembly.

The present disclosure also relates to a terminal block assembly configured to be disposed within a receptacle of a plastic housing of a battery module. The terminal block assembly includes a plastic base, and an electrical assembly overmolded by the plastic base. The electrical assembly includes a bus bar and a major terminal, where the major terminal includes a base retained within a pocket defined at least in part by flaps of the bus bar folded around a perimeter of the base. The bus bar is not welded to the major terminal.

The present disclosure also relates to a battery module having a terminal post assembly. The terminal block assembly includes a plastic base and an electrical assembly. The electrical assembly is at least partially overmolded by the plastic base. The plastic base is configured to be received within a receptacle of a plastic housing. Further, the electrical assembly includes a terminal post and a bus bar, where the bus bar retains a base of the terminal post within a pocket of the bus bar. The bus bar receives a post of the terminal post through an opening in the bus bar, and the bus bar is not welded to the terminal post.

DRAWINGS

Various aspects of this disclosure may be better understood upon reading the following detailed description and upon reference to the drawings in which.

Figure 3:
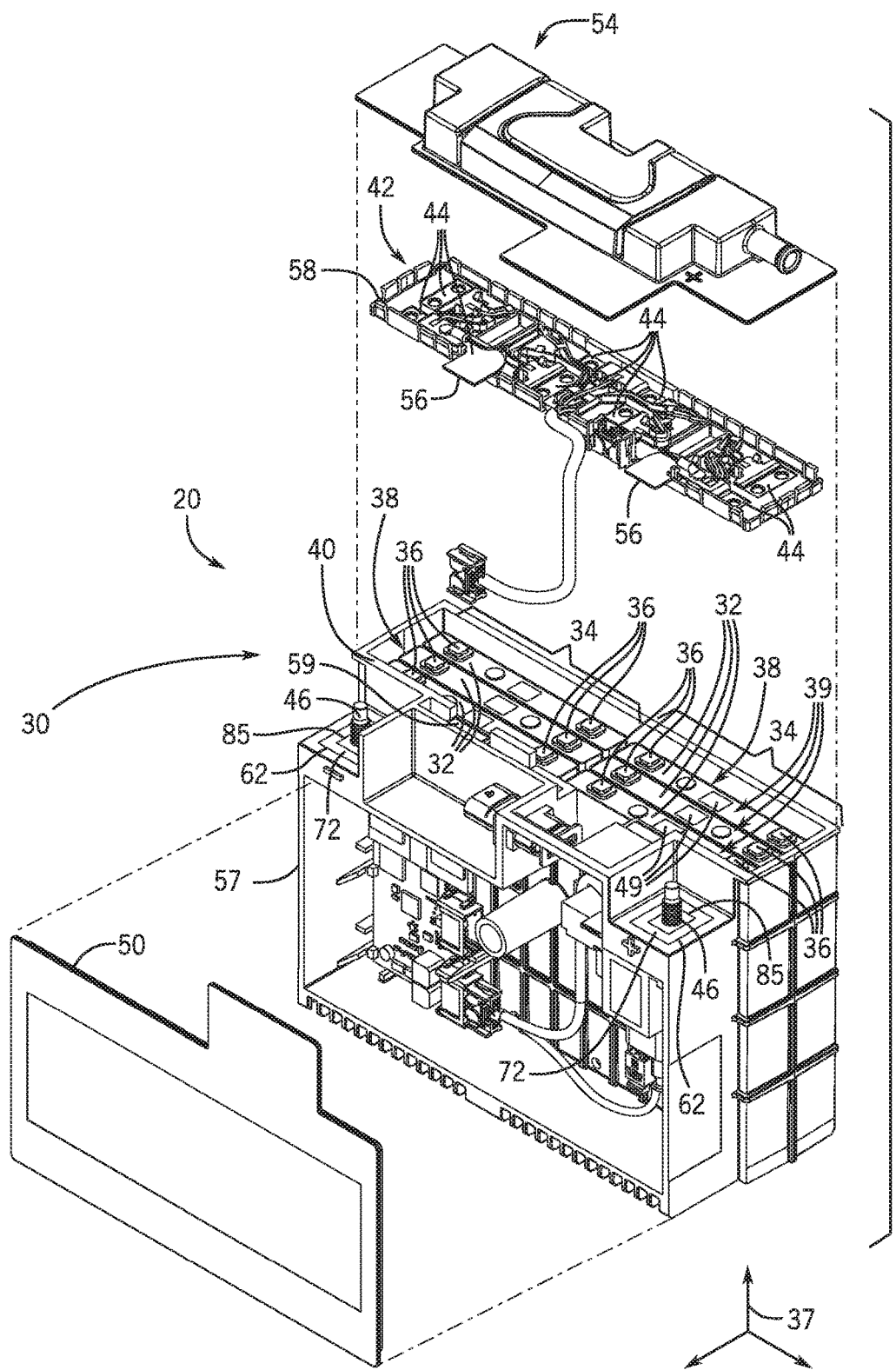
FIG. 3 is an exploded perspective view of an embodiment of a battery module for use in the battery system of FIG. 1, in accordance with an aspect of the present disclosure.
Figure 4:
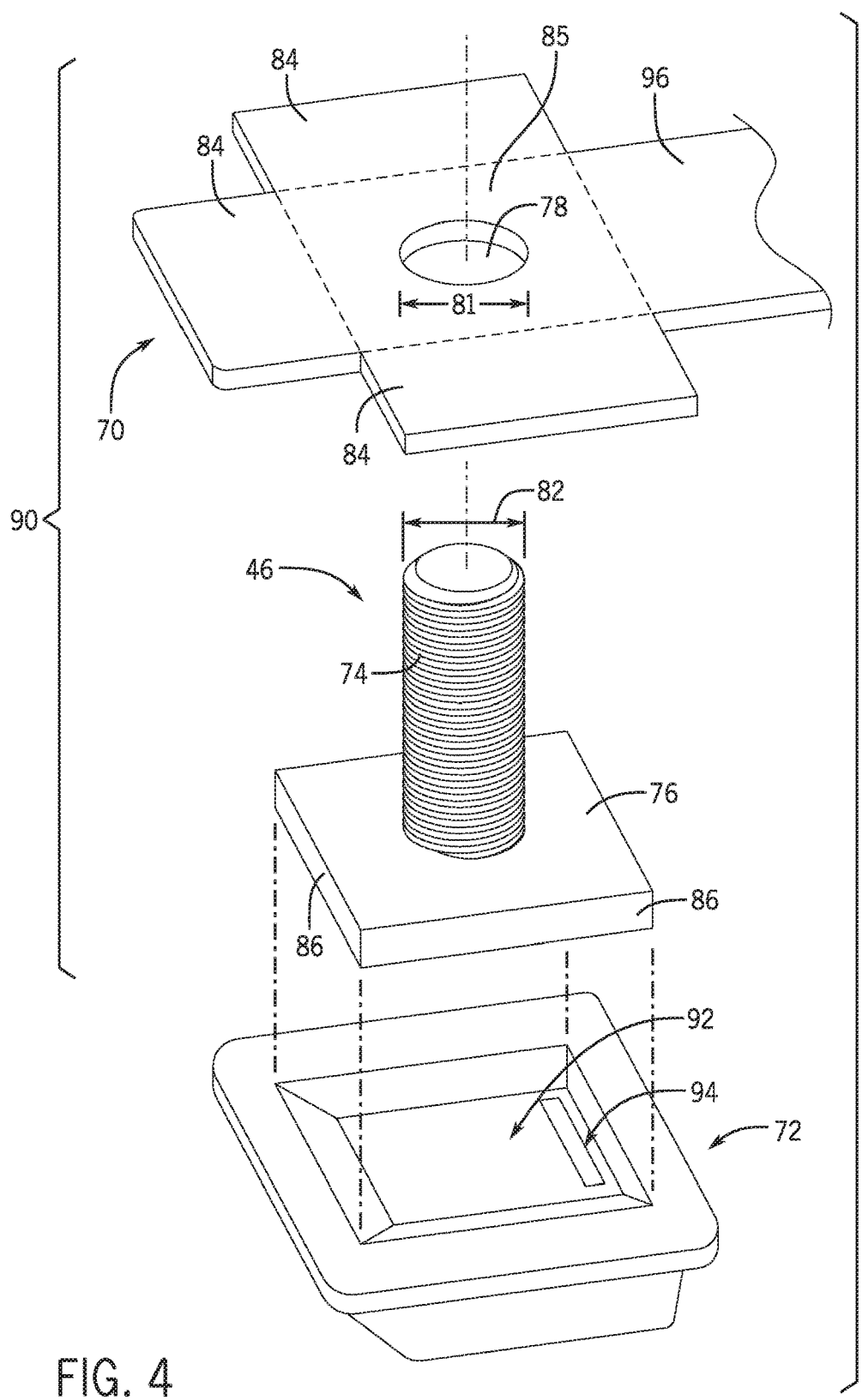
Figure 5:
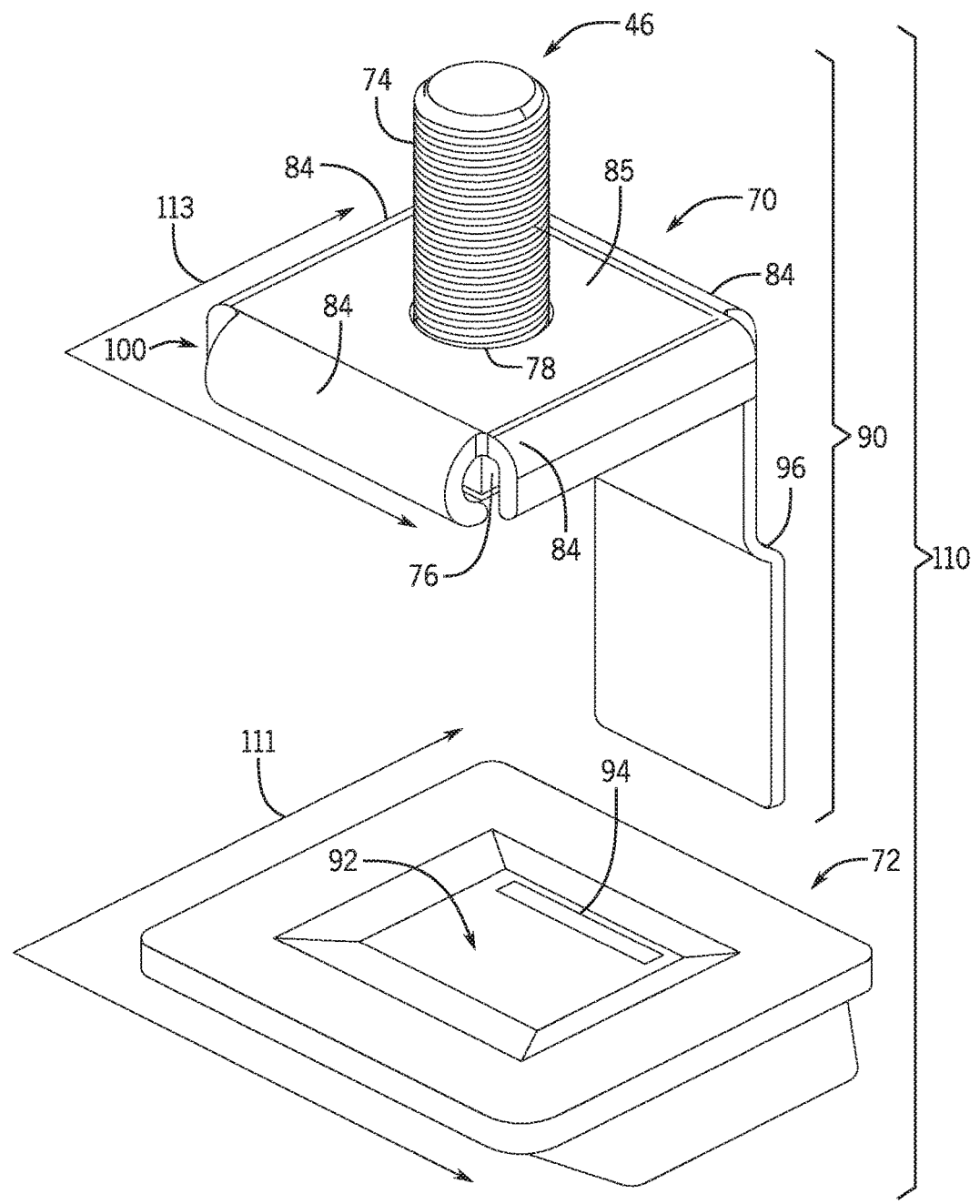
Figure 6:
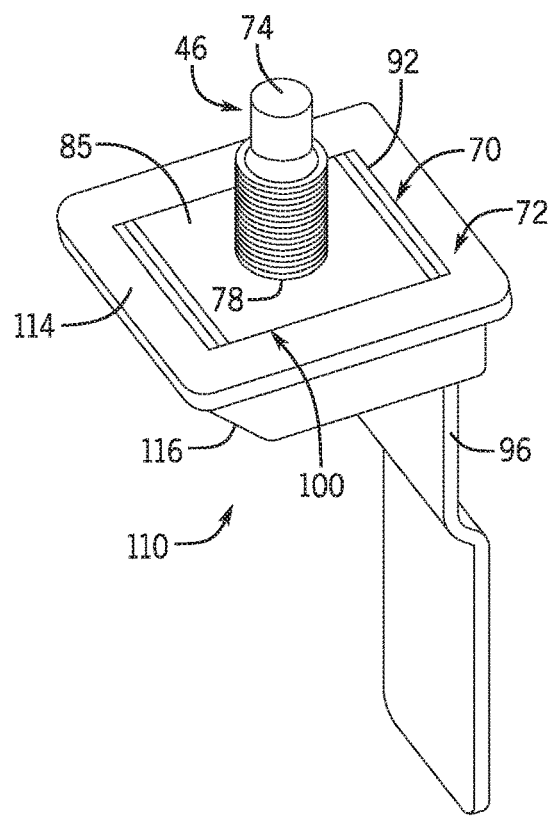
Figure 7:
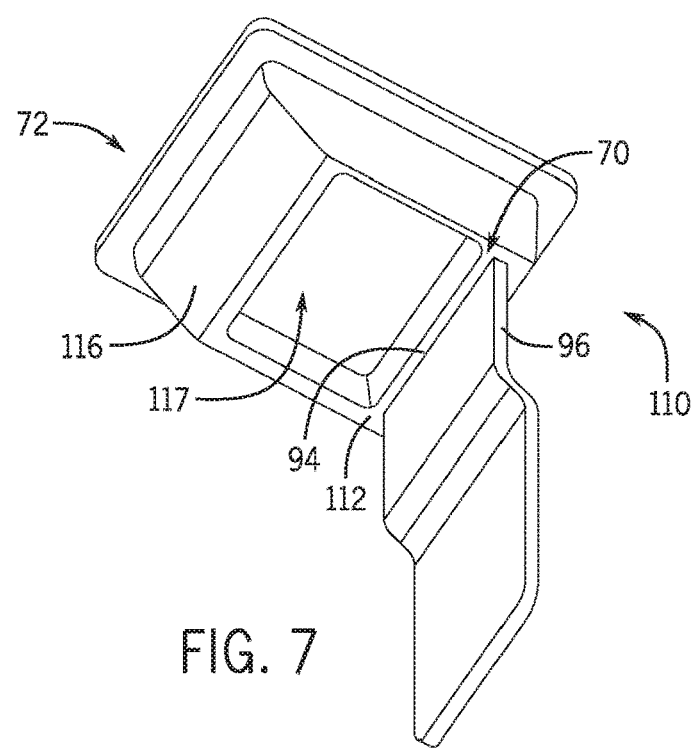
Figure 8:
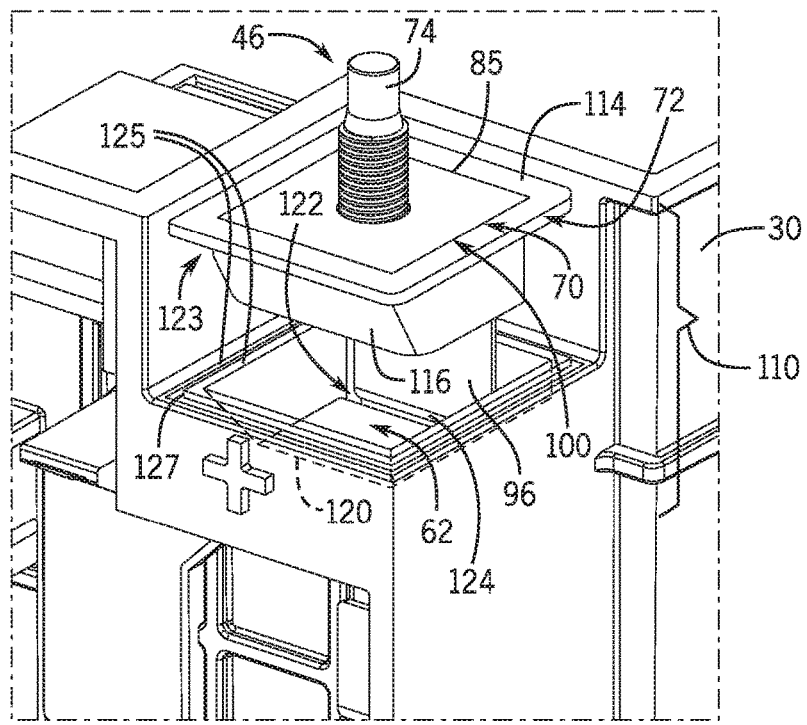
Figure 9:
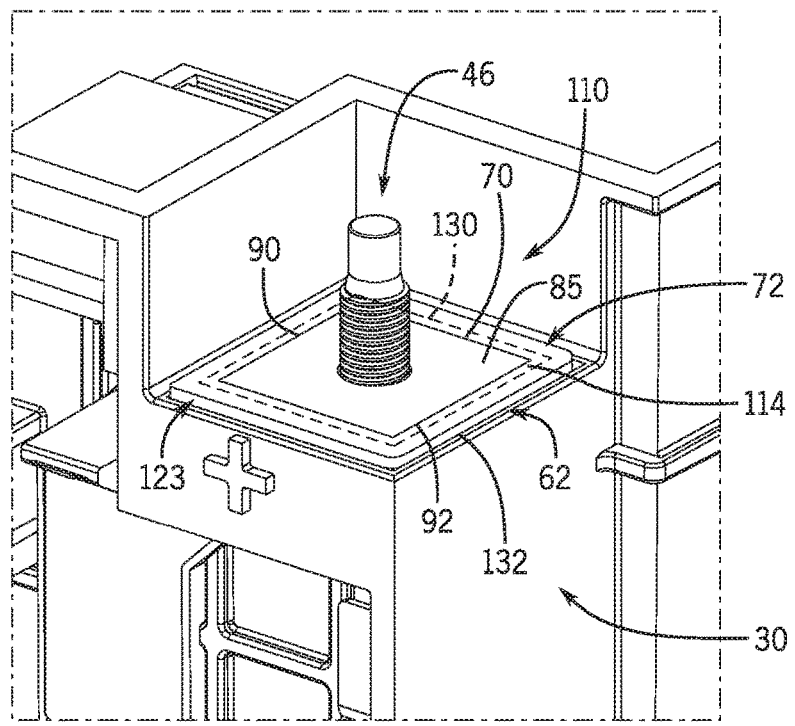
Figure 10:
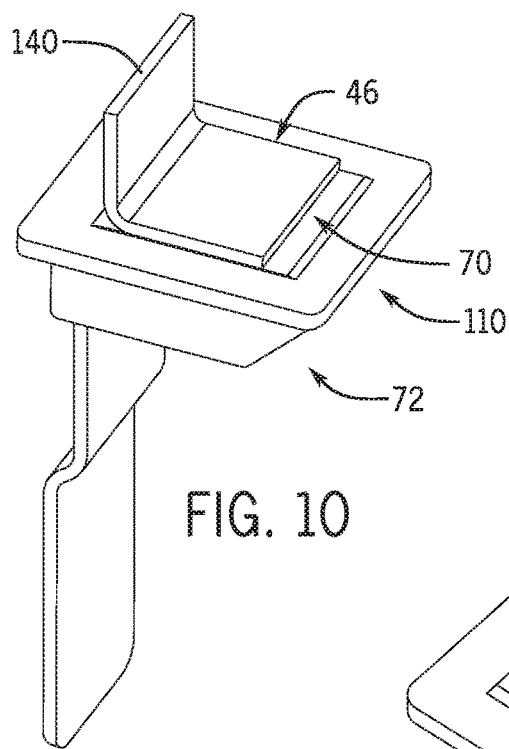
Figure 11:
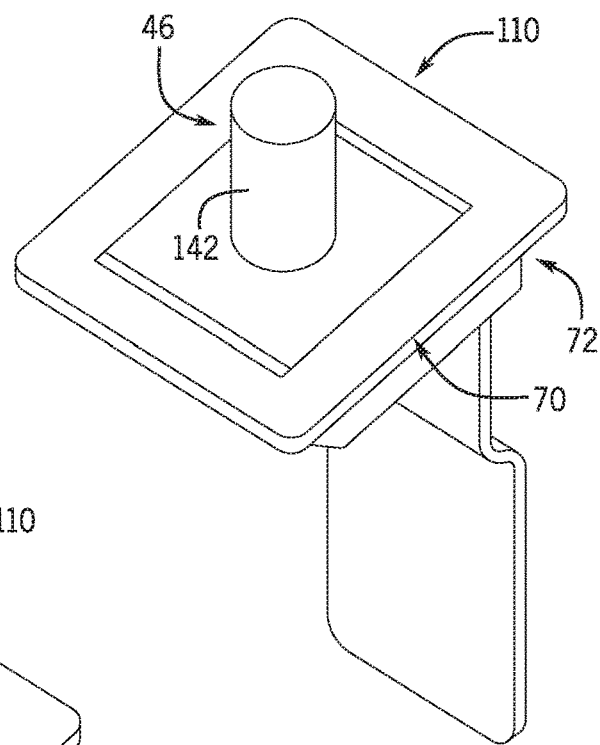
Figure 12:
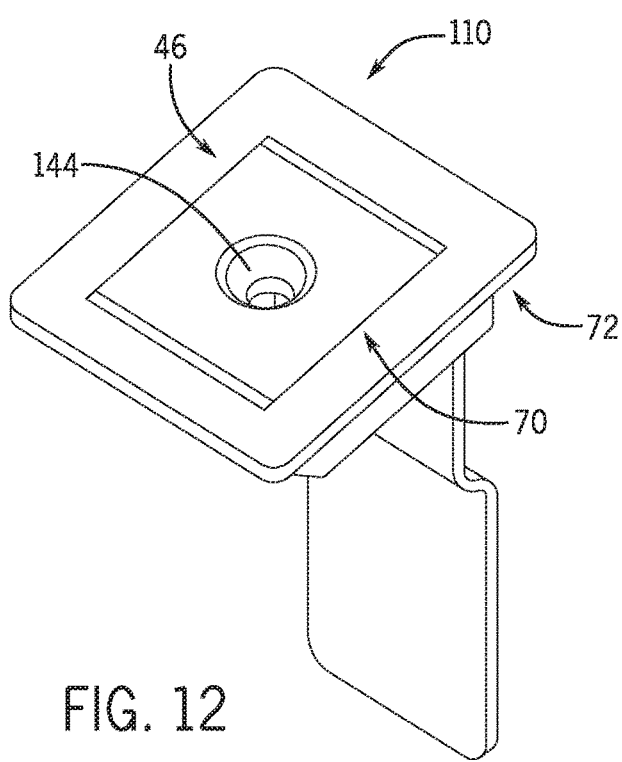
Figure 13:
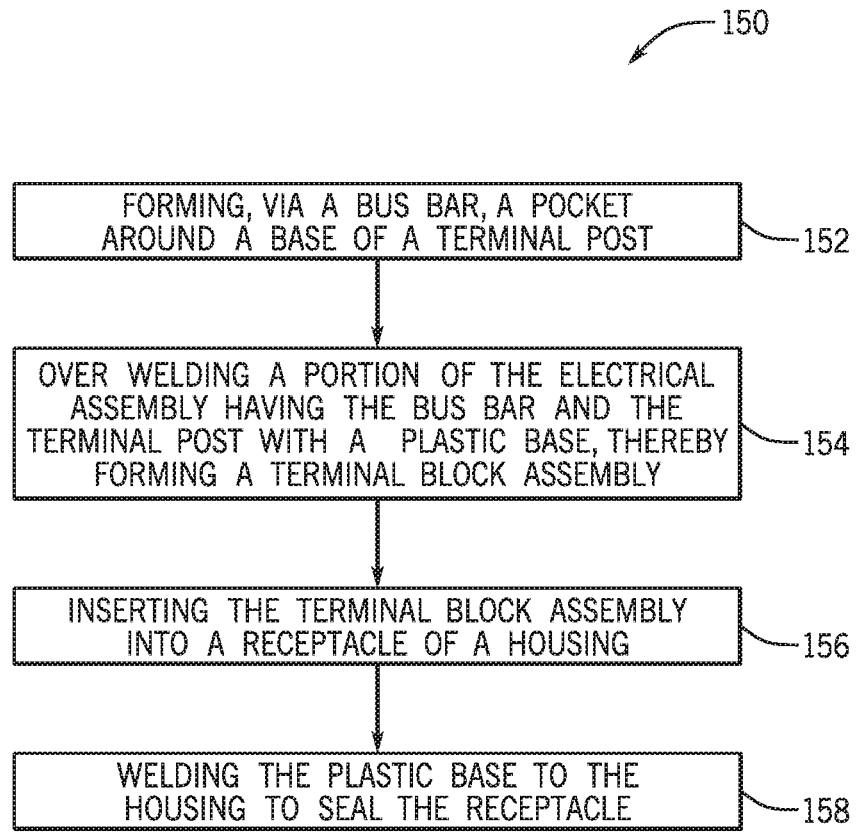

FIG. 4 is an exploded perspective view of an embodiment of a terminal post, a bus bar configured to form a pocket, and a plastic base configured to be inserted into a receptacle of a housing of the battery module of FIG. 3, in accordance with an aspect of the present disclosure FIG. 5 is an exploded perspective view of an embodiment of the terminal post, the bus bar forming the pocket, and the plastic base of FIG. 4, in accordance with an aspect of the present disclosure;

FIG. 6 is a perspective view of an embodiment of a terminal block assembly of the terminal post, the bus bar forming the pocket, and the plastic base of FIG. 4, in accordance with an aspect of the present disclosure;

FIG. 7 is a bottom perspective view of an embodiment of the terminal block assembly of FIG. 6, in accordance with an aspect of the present disclosure;

FIG. 8 is a perspective view of an embodiment of a receptacle of a housing receiving the terminal block assembly of FIG. 6, in accordance with an aspect of the present disclosure;

FIG. 9 is a perspective view of an embodiment of the terminal block assembly of FIG. 6 positioned in the receptacle of FIG. 8, in accordance with an aspect of the present disclosure;

FIG. 10 is a perspective view of an embodiment of a terminal block assembly (e.g., for insertion into the receptacle of FIG. 8) having a terminal, a bus bar forming a pocket, and a plastic base, in accordance with an aspect of the present disclosure;

FIG. 11 is a perspective view of an embodiment of a terminal block assembly (e.g., for insertion into the receptacle of FIG. 8) having a terminal, a bus bar forming a pocket, and a plastic base, in accordance with an aspect of the present disclosure;

FIG. 12 is a perspective view of an embodiment of a terminal block assembly (e.g., for insertion into the receptacle of FIG. 8) having a terminal, a bus bar forming a pocket, and a plastic base, in accordance with an aspect of the present disclosure; and FIG. 13 is a process flow diagram illustrating a method of manufacturing the battery module of FIG. 3, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, individual electrochemical cells may be positioned in a housing of the battery module, and terminals (e.g., minor terminals or cell terminals) of the electrochemical cells may extend generally away from the housing. To couple the electrochemical cells together (e.g., in series or parallel), an electrical path between minor terminals of two or more electrochemical cells may be established by coupling pairs of minor terminals via corresponding bus bars. Further, two of the electrochemical cells (e.g., on either end of the battery module or on ends of one or more stacks of electrochemical cells) may be electrically coupled to major terminals (e.g., module terminals, primary terminals, or terminal posts) of the battery module via corresponding bus bars, or via corresponding bus bar assemblies, where the major terminals are configured to be coupled to a load for powering the load.

In traditional configurations, to ensure that the major terminals and their associated bus bars do not become decoupled, the major terminals and the bus bars may be welded together. However, welding of the major terminal and the bus bar may require that the material of the bus bar is the same as the material of the major terminal, or at least compatible for welding. Further, the material of the bus bars may depend on the material of the corresponding minor terminals (e.g., of the electrochemical cells) from which the bus bars extend, or the material of the bus bars may depend on the material of one or more intervening components (e.g., a shunt coupled to a printed circuit board). This may increase a material cost of the battery module and complexity of manufacturing. Further, associated geometries, assemblies, and welding techniques for traditional configurations such as those described above may contribute to a volume of the battery module, thereby reducing an energy density of the battery module.

To address these and other shortcomings of traditional battery module configurations, battery modules in accordance with the present disclosure include major terminals and bus bars having similar or dissimilar materials, where the major terminals and bus bars are coupled together without welding. For example, each major terminal (e.g., on either side of the battery module or stacks of electrochemical cells) may include a base and a post extending from the base.

A corresponding bus bar extending from the major terminal may be a flat sheet (or initially a flat sheet) with an opening configured to receive the post of the major terminal. Generally, the flat sheet is capable of being wrapped around at least a portion of the major terminal (e.g., at least the base). For instance, the flat sheet of the bus bar may include flaps extending from a body (e.g., a rectangular body) of the flat sheet. After extending the post of the major terminal through the opening in the flat sheet (which may itself be the bus bar), the flaps may be wrapped around the base of the major terminal to envelop or retain the base (e.g., within a pocket of the bus bar). For example, the flaps may be heated to enhance pliability and enable wrapping of the flaps around the base of the major terminal, thereby enabling the bus bar and the major terminal to be electrically connected without negatively affecting the integrity of the bus bar, and without welding. Alternatively, the flaps may be wrapped around the base of the major terminal via a cold forming process in which the bus bar is lubricated, the base of the major terminal is positioned proximate to the bus bar, and the bus bar (e.g., as a flat sheet) is pushed or pulled through an opening in a cold forming molding component that causes (e.g., forces) the flaps to bend around the base of the bus bar, thereby enveloping the base via a pocket of the bus bar. The flaps of the bus bar may be stamped, pressed, or maneuvered in some other manner in place around the base of the major terminal.

Further, in accordance with present embodiments, the assembly of the major terminal and the bus bar (e.g., having the pocket that receives the base of the major terminal) may be overmolded by a plastic base configured to be received by a receptacle or cavity in a housing of the battery module. For example, the plastic base may be sized to fully encompass the base of the major terminal and the pocket of the bus bar, and the plastic base may be shaped to correspond with a shape of the receptacle in the housing. After overmolding the assembly of the bus bar and the major terminal with the plastic base, and after disposing the plastic base into the receptacle of the housing, the plastic base may be welded to the housing to block leakage of electrolyte from the housing and/or leakage of moisture or fluid into the housing. In some embodiments, additional features may be included to block leakage of fluids into or out of the housing. Certain of these and other features will be described in detail below with reference to the figures.

Figure 1:
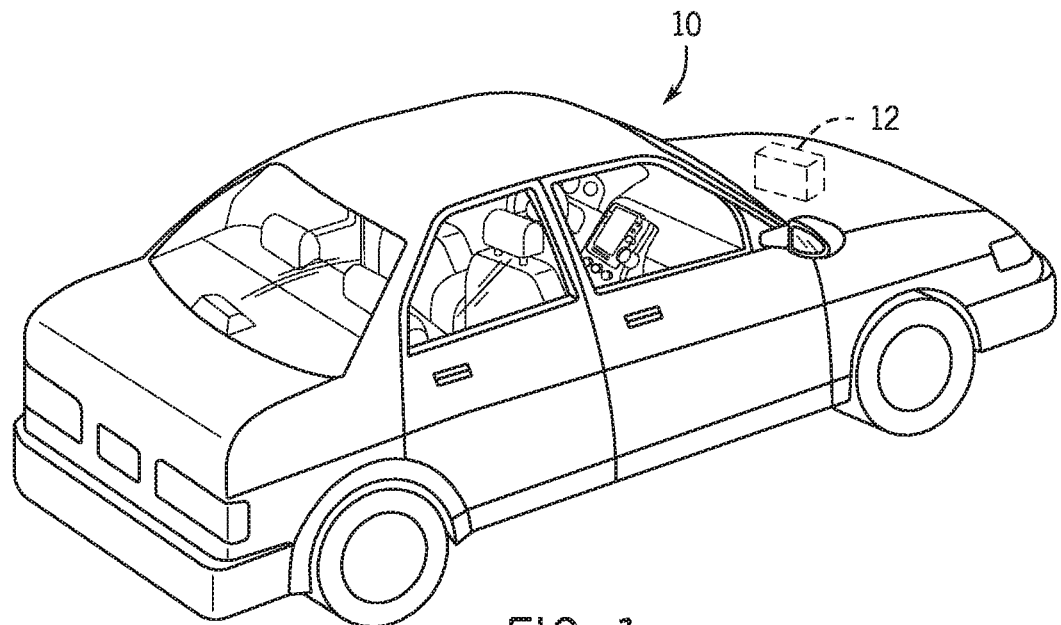
FIG. 1 is a perspective view of a vehicle having a battery system configured in accordance with present embodiments to provide power for various components of the vehicle.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
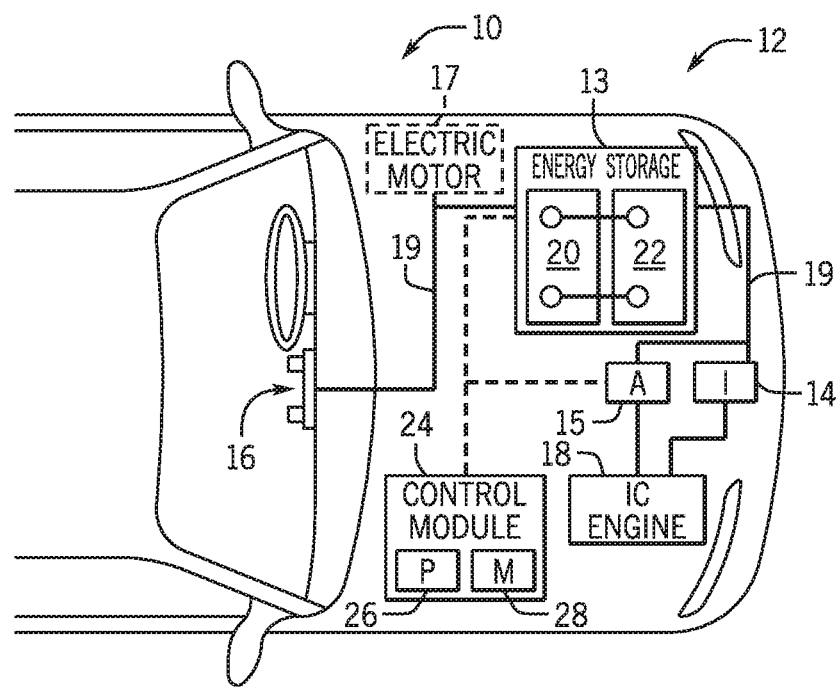
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

In accordance with an aspect of the present disclosure, the battery module 20 may include terminal posts, each terminal post having a base and a post extending from the base. A bus bar (or assembly of bus bar components) may extend from a group of interconnected electrochemical cells to the base of the terminal post. Further, the bus bar may include flaps that wrap around (e.g., envelop) the base of the terminal post within a pocket of the bus bar. At least a portion of an assembly of the bus bar and the terminal post may be overmolded by a plastic base component. For example, the pocket of the bus bar and the base of the terminal post may be overmolded by the plastic base. Further still, the plastic base may be received within a receptacle of a housing of the battery module, and the plastic base may be welded to, or otherwise sealed within, the housing.

An overhead exploded perspective view of an embodiment of the battery module 20 for use in the vehicle 10 of FIG. 2 is shown in FIG. 3. In the illustrated embodiment, the battery module 20 (e.g., lithium-ion [Li-ion] battery module) includes a housing 30 and electrochemical cells 32 (e.g., prismatic lithium-ion [Li-ion] electrochemical cells) disposed inside the housing 30. In the illustrated embodiment, six prismatic Li-ion electrochemical cells 32 are disposed in two stacks 34 within the housing 30, three electrochemical cells 32 in each stack 34. However, in other embodiments, the battery module 20 may include any number of electrochemical cells 32 (e.g., 2, 3, 4, 5, 6, 7, 8, 9, 10, or more electrochemical cells), any type of electrochemical cell 32 (e.g., Li-ion, lithium polymer, lead-acid, nickel cadmium, or nickel metal hydride, prismatic, and/or cylindrical), and any arrangement of the electrochemical cells 32 (e.g., stacked, separated, or compartmentalized).

As shown, the electrochemical cells 32 may include terminals 36 (e.g., cell terminals, minor terminals) extending upwardly (e.g., in direction 37) from terminal ends 39 of the electrochemical cells. Accordingly, the terminals 36 may extend into an opening 38 disposed in an upper side 40 or face of the housing 30. For example, the electrochemical cells 32 may be inserted into the housing 30 through the opening 38 in the upper side 40, and positioned within the housing 30 such that the terminals 36 of the electrochemical cells 32 are disposed in the opening 38. A bus bar carrier 42 may be disposed into the opening 38 and may retain bus bars 44 (e.g., minor bus bars, terminal bus bars) disposed thereon and configured to interface with the terminals 36 of the electrochemical cells 32. For example, the bus bars 44 may interface with the terminals 36 to electrically couple adjacent electrochemical cells 32 together (e.g., to form a group of electrically interconnected electrochemical cells 32). The bus bars 44 may be mounted or disposed on or proximate to a top or a bottom face or surface of the bus bar carrier 42 (e.g., facing away from the electrochemical cells 32 or facing the electrochemical cells 32). However, in other embodiments, the battery module 20 may not include the bus bar carrier 42 and the bus bars 44 may be disposed directly onto the terminals 36.

Depending on the embodiment, the bus bars 44 may couple the electrochemical cells 32 in series, in parallel, or some of the electrochemical cells 32 in series and some of the electrochemical cells 32 in parallel. In general, the bus bars 44 enable a group of electrically interconnected electrochemical cells 32. Further, certain of the bus bars 44 may be configured to enable electrical coupling of the group of electrically interconnected electrochemical cells 32 with major terminals 46 (e.g., module terminals, terminal posts) of the battery module 20, where the major terminals 46 are configured to be coupled to a load (e.g., component(s) of the vehicle 10 of FIGS. 1 and 2) to power the load. A cover 54 (which may be a part of the housing 30 or may be a separate component) may be disposed over the bus bar carrier 42 to seal the opening 38 in the housing 30 of the battery module 20 and/or to protect the bus bars 44, other components disposed on the bus bar carrier 42, and/or other components of the battery module 20. Further, a panel 50 may be disposed over an adjacent side 57 of the housing 30 to protect other components (e.g., electrical components) fixed to the adjacent side 57 of the housing 30.

As previously described, the major terminals 46 of the battery module 20 may be coupled with the group of interconnected electrochemical cells 32 via bus bars (not shown) or assemblies of bus bars. However, it should be noted that the bus bars (not shown) extending from the group of interconnected electrochemical cells 32 to major terminals 46 may be shaped differently than the bus bars 44 connecting the electrochemical cells 32 to form the group of interconnected electrochemical cells 32. Indeed, as previously described the bus bar electrically coupled to the major terminal 46 may include flaps that envelop a base of the major terminal 46 within a pocket of the bus bar. The pocket of the bus bar and the base of the major terminal 46 may, as shown in the illustrated embodiment, be overmolded by a plastic base 72 that is received by (e.g., inserted into) a receptacle 62 of the housing 30. The plastic base 72 may be welded to the housing 30, or otherwise sealed within the receptacle 62. These and other features of the major terminals 46 and corresponding bus bars, the plastic bases 72, and the receptacles 62 of the housing 30 will be described in detail below.

Turning now to FIG. 4, an exploded perspective view of an embodiment of the terminal post 46, a bus bar 70 (e.g., major bus bar), and a plastic base 72 configured to be inserted into a receptacle of a housing of the battery module 20 of FIG. 3 is shown. In the illustrated embodiment, the terminal post 46 includes a post 74 extending from a base 76. The base in the illustrated embodiment includes a generally rectangular cross-section, and may be integrally formed with the post 74. In the illustrated embodiment, the base 76 is generally axially aligned along a shared axis with the post 74 and positioned at a distal end of the post 76. Further, the base 76 has a perimeter (e.g., defined by sides 86) that extends beyond the perimeter of the post 74 relative to the shared axis. In some embodiments, the base 76 and the post 74 may be separate components that are welded or otherwise joined together (e.g., by screwing the post 74 into a threaded opening in the base 76).

The bus bar 70 includes an opening 78 sized to receive the post 74 of the terminal post 46. For example, the opening 78 may include a diameter 80 that is approximately equal to, or slightly larger than, a maximum diameter 82 of the post 74 of the terminal post 46. The bus bar 70 also includes flaps 84 configured to be folded around the sides 86 (e.g., perimeter) of the base 76 of the terminal post 46. For example, as previously described, and as set forth in detail below, the flaps 84 may fold around the sides 86 (e.g., perimeter) of the base 76 to envelope the base 76 within a pocket of the bus bar 70.

For example, an exploded perspective view of an embodiment of the terminal post 46, the bus bar 70 having the flaps 84 folded around the base 76 of the terminal post 46, and the plastic base 72 is shown in FIG. 5. In the illustrate embodiment, at least the flaps 84 and the central portion 85 of the bus bar 70 form a pocket 100 which receives the base 76 of the terminal post 46. Because the base 76 is generally rectangular in shape, the pocket 100 of the bus bar 70 may block rotation of the terminal post 46 when a component (e.g., a load, or a lead to the load) is coupled with the terminal post 46. For example, the lead (e.g., to the load) may screw into the post 74 of the terminal post 46, and the pocket 100 (e.g., formed at least by the flaps 84 and a central portion 85) of the bus bar 70 may physically contact the base 76 of the terminal post 46 to block rotation of the terminal post 46 at the base 76.

As shown, the bus bar 70 and the terminal post 46 may together form an electrical assembly 90. At least a portion of the electrical assembly 90 may be overmolded by the plastic base 72 in the illustrated embodiment. For example, at least the pocket 100 (e.g., formed by the flaps 84 and the central portion 85) of the bus bar 70, and the base 76 of the terminal post 46, may be overmolded by the plastic base 72. In the illustrated embodiment, the electrical assembly 90 may be overmolded by the plastic base 72 such that the electrical assembly 90 (or a portion thereof) sits within an interior 92 of the plastic base 72. Due to the overmolding process, the material of the plastic base 72 may fill space between the bus bar 70 and the base 76 of the terminal post 46, thereby enhancing the ability of the terminal post 46 to resist rotation when a lead is coupled with the post 74 of the terminal post 46. Accordingly, while the interior 92 of the plastic base 72 is shown as being a generally open space for clarity in the illustrated embodiment, the interior 92 may include plastic embedded within spaces of the interior 92 that are not occupied by the electrical assembly 90 (e.g., due to overmolding).

In accordance with present embodiments, the plastic base 72 may include an opening 94 extending through a bottom of the plastic base 72 and in fluid communication with the interior 92 of the plastic base 72. Accordingly, an extension 96 of the bus bar 70 may be folded downwardly such that the extension 96 extends through the opening 94 in the plastic base 72. Thus, when the plastic base 72 and the electrical assembly 90 are disposed into the receptacle in the housing of the battery module (e.g., as shown in, and described with reference to, FIG. 3), the extension 96 of the bus bar 70 may extend into an inside of the housing, thereby facilitating coupling of the extension 96 with an interconnected group of electrochemical cells disposed within the housing. It should be noted that the extension 96 (e.g., extending through the opening 94 in the plastic base 72) may be an integral extension of the bus bar 70, or the extension 96 may be (or include) a separate component welded to, or otherwise coupled with, the bus bar 70.

It should also be noted that the plastic base 72, together with the electrical assembly, forms a modular terminal block assembly 110. In order to reduce a size of the modular terminal block assembly 110, the plastic base 72 may include a first cross-sectional area 111 similar in size to a second cross-sectional area 113 of the combined pocket 100 of the bus bar 70 and the base 76 of the terminal post 46. In other words, the first cross-sectional area 111 may be greater in size than the second cross-sectional area 113 (greater than 100% the size of the cross-sectional area 113), but less than 300% the size of the second cross-sectional area 113, less than 200% the size of the second cross-sectional area 113, less than 150% the size of the second cross-sectional area 113, less than 125% the size of the second cross-sectional area 113, less than 110% the size of the second cross-sectional area 113, less than 105% the size of the second cross-sectional area 113, or less than 102% the size of the second cross-sectional area 113.

A top perspective view of an embodiment of the terminal block assembly 110 of the terminal post 46, the bus bar 70 (e.g. forming the pocket 100), and the plastic base 72 is shown in FIG. 6. Further, a bottom perspective view of an embodiment of the terminal block assembly 110 is shown in FIG. 7. Focusing first on FIG. 7, as previously described, the extension 96 of the bus bar 70 (or coupled with the bus bar 70) may extend through the opening 94 in the plastic base 72. The opening 94 extends through a bottom 112 of the plastic base 72, such that the extension 96 may extend from the interior 92 (e.g., shown in FIG. 6) or cavity of the plastic base 72 and through the bottom 112 of the plastic base 72. Accordingly, the extension 96 may access an interior or inside of a housing (e.g., to couple with a group of interconnected electrochemical cells either directly or by coupling with intervening electrical connectors). The plastic base 72 may also include a recess 117 in the bottom 112 of the plastic base 72, which reduces an amount of material used for the plastic base 72 and may be accessible to vent gases.

Focusing now on FIG. 6, the central portion 85 of the bus bar 70 (e.g., which forms at least a portion of the pocket 100 of the bus bar 70) may be exposed along an upper surface 114 of the plastic base 72. For example, the central portion 85 may extend slightly above the upper surface 114. By disposing the central portion 85 of the bus bar 70 slightly above the upper surface 114, a lead extending from a load (e.g., the load intended to be powered by the battery) may engage (e.g., physically contact and/or press into) the central portion 85 of the bus bar 70, thereby establishing an enhanced physical connection that would not otherwise be possible if the upper surface 114 of the plastic base 72 blocked the lead from doing so. In other words, the lead may screw into or otherwise couple with the post 74 of the terminal post 46 until the lead contacts the central portion 85 of the bus bar 70.

As shown in both FIG. 6 and FIG. 7, the plastic base 72 may include a slanted or tapered surface 116 configured to match (or be compatible with) a surface defining the receptacle in the housing. Accordingly, the plastic base 72 may more easily be disposed into the receptacle than would otherwise be possible if the plastic base 72 were, for example, a generally untapered prism that fits into a corresponding generally untapered receptacle. Further, the compatible tapered surface 116 and surface of the housing defining the receptacle may facilitate improved blockage of fluid ingress and egress to and from the housing.

Turning now to FIGS. 8 and 9, perspective views of the terminal block assembly 110 of FIGS. 6 and 7 being inserted into the receptacle 62 of the housing 30, and positioned within the receptacle 62 of the housing 30, respectively, are shown. Focusing first on the embodiment illustrated in FIG. 8, the receptacle 62 includes, as previously described, a slanted or tapered surface 120 corresponding with the slanted or tapered surface 116 of the plastic base 72 of the terminal block assembly 110. Accordingly, the plastic base 72 may be easily received by the receptacle 62, and the tapered surfaces 116, 120 may physically contact one another, or reduce an amount of space between the housing 30 and the plastic base 72 to less than would otherwise be possible with, for example, a generally untapered base and receptacle.

As shown in FIG. 8, the receptacle 62 configured to receive the terminal block assembly 110 may include an opening 122 configured to receive the extension 96 of the bus bar 70. Accordingly, the extension 96 may extend through an opening in the plastic base 72 (e.g., the opening 94 in FIGS. 4, 5, and 7), and the extension 96 may extend through the opening 122 in the receptacle 62. The opening in the plastic base 72 (e.g., the opening 94 in FIGS. 4, 5, and 7) may be aligned with the opening 122 in the receptacle 62, or the opening in the plastic base 72 may be offset from the opening 122 in the receptacle 62, such that a curvature 124 in the extension 96 enables the extension 96 to traverse from the plastic base 72 into the opening 122. By offsetting the opening in the plastic base 72 (e.g., the opening 94 in FIGS. 4, 5, and 7) from the opening 122 in the receptacle 62 of the housing 30, fluid ingress and egress may be reduced. In some embodiments, the openings 94, 122 may be sealed to further reduce fluid ingress and egress. Further, as described in detail below, a lip 123 of the plastic base 72 may be welded to one or more surfaces 125 of the housing 30 (e.g., where the surface 125 surrounds the receptacle 62) to seal the terminal block assembly 110 within the receptacle 62. As shown, the lip 123 may weld to two surfaces 125 separated by a channel 127, where the channel 127 acts as a labyrinth to reduce a likelihood that fluids leak into, or out of, the receptacle 62.

Turning now to FIG. 9, the terminal block assembly 110 is shown disposed within the receptacle 62 of the housing 30. To seal the receptacle 62, the plastic base 72 of the terminal block assembly 110 may be welded to the housing 30. For example, as shown, the lip 123 of the plastic base 72 may be welded to the housing 30 along a weld region 130 on the upper surface 114 of the plastic base 72. In the illustrated embodiment, the lip 123 of the plastic base 72 is welded along only one weld region 130. However, as described with respect to FIG. 8, the lip 123 of the plastic base 72 may be welded to more than one surface of the housing 30 along multiple weld regions.

In some embodiments, the plastic base 72 and/or housing 30 may be additionally or alternatively sealed via other manners (e.g., by covering or welding over spaces 130 between the plastic base 72 and the housing 30). Further, to seal the electrical assembly 90 (e.g., having the terminal post 46 and the bus bar 70) within the interior 92 (e.g., cavity) of the plastic base 72, a strip (e.g., adhesive strip) may be disposed over the central portion 85 of the bus bar 70 and the upper surface 114 of the plastic base 72, such that the strip (e.g., adhesive strip) seals the crevice between the bus bar 70 and the plastic base 72.

Turning now to FIGS. 10, 11, and 12, perspective views of embodiments of the terminal block assembly 110 (e.g., for insertion into the receptacle 62 of FIG. 8) are shown. In FIG. 10, the terminal post 46 includes a flange 140 instead of a post, where the flange 140 may be welded to, or retained by (e.g., via a pocket), the bus bar 70. A clamp of a lead may be clamped onto the flange 140, or an electrical component of the lead may be welded to the flange 140. In FIG. 11, the terminal post 46 includes a smooth post 142 retained by the bus bar 70 (e.g., via a pocket, as previously described), instead of having a threaded post. A clamp of a lead may be clamped onto the smooth post 142, instead of a threaded lead being screwed onto a threaded post. In FIG. 12, the terminal post 46 includes a female recess 144 instead of a post, where the female recess 144 may be a part of a base of the terminal post 46 and the base is retained by the bus bar 70. Alternatively, the female recess 144 may be integral with the bus bar 70 itself, such that no terminal post 46 is included other than the bus bar 70 itself. In either embodiment, the female recess 144 may be configured to receive a post of a lead. The female recess 144 may, in some embodiments, be threaded, such that a threaded post of the lead is screwed into the female recess. As suggested by the illustrations, a technical advantage of presently disclosed embodiments is the ability to provide modular solutions having various types of terminals. For example, different terminals may be incorporated based on customer demands.

Turning now to FIG. 13, a process flow diagram illustrating a method 150 of manufacturing the battery module 20 of FIG. 3 is shown. In the illustrated embodiment, the method 150 includes forming (block 152), via a bus bar, a pocket around a base of a terminal post. For example, as previously described, the bus bar may include an opening through which a post of the terminal post extends, and flaps surrounding the portion of the bus bar having the opening. The flaps may be folded downwardly (e.g., away from the post of the terminal post) around the base of the terminal post. The flaps may be bended or folded around the base by heating the flaps, or the flaps may be bended or folded around the base via a cold forming process. In general, the base may be rectangular, such that the pocket, when formed around the base of the terminal post, blocks rotation of the base if a lead engages with (e.g., screws onto) the post of the terminal post. The bus bar and the terminal post together may form an electrical assembly, as previously described.

The method 150 also includes overmolding (block 154) at least a portion of the electrical assembly having the bus bar and the terminal post via a plastic base. For example, the pocket of the bus bar and the base of the terminal post may be overmolded by the plastic such that a central portion of the pocket of the bus bar (e.g., where the central portion includes the opening through which the post of the terminal post extends) is exposed (e.g., extends slightly above) an upper surface of the plastic base. The overmolded plastic may fill spaces between the bus bar and the base of the terminal post, thereby enhancing the terminal post's ability to resist rotation when the lead engages with (e.g., screws onto) the post of the terminal post.

The method 150 also includes inserting (block 156) the terminal block assembly into a receptacle (e.g., a cavity) of a housing of the battery module. For example, as previously described, the receptacle may be formed within the housing. The plastic base of the terminal block assembly may include at least one tapered surface, and the receptacle of the housing may also include a corresponding at least one tapered surface. Thus, the terminal block assembly may be easily inserted into the receptacle, and a mating between the plastic base of the terminal block assembly and the receptacle of the housing may be enhanced. For example, a space between the tapered surface(s) of the plastic base and the tapered surface(s) of the receptacle may be less than would otherwise be possible if, for example, the plastic base and the receptacle were generally untapered.

The method 150 also includes welding (block 158) the plastic base to the housing to seal the receptacle. For example, the plastic base may include a lip that sits on one or more surfaces of the housing. The plastic base may be welded to the one or more surfaces of the housing along a top surface of the plastic base. Additionally or alternatively, other mechanisms may be utilized to improve a seal of the terminal block assembly within the receptacle of the housing. For example, an adhesive strip may be disposed over the upper surface of the plastic base and over the exposed portion of the bus bar, such that a crevice between the bus bar and the upper surface of the base is sealed.

One or more of the disclosed embodiments, alone or in combination, may provide one or more technical effects useful in the manufacture of battery modules, and portions of battery modules. In general, embodiments of the present disclosure include a terminal block assembly having a bus bar that envelops a base of a terminal post within a pocket of the bus bar, where the pocket is defined by flaps of the bus bar that bend around the base of the terminal post. The pocket and the base are overmolded by a plastic base of the terminal block assembly. Overmolding the pocket and the base by the plastic base enhances an ability of the terminal post to resist rotation when a lead is engaged with the terminal post. Further, forming the terminal block assembly facilitates modular manufacturing of the terminal block assembly that can be easily positioned within a receptacle of a housing, such that the electrical components of the terminal block assembly electrically couple with the electrochemical cells of the battery module. The plastic base of the terminal block assembly may also be welded and sealed to the plastic housing. Accordingly, the terminal posts of the battery module are easily integrated in a way that reduces fluid ingress and egress to and from the battery module. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
a terminal block assembly having an electrical assembly and a plastic base, wherein the electrical assembly comprises a terminal post and a bus bar coupled with the terminal post, and wherein at least a portion of the electrical assembly is overmolded by the plastic base; and
a plastic housing having a receptacle configured to receive the plastic base of the terminal block assembly;
wherein the plastic base comprises a lip configured to contact a surface of the plastic housing surrounding the receptacle of the plastic housing, and wherein the battery module comprises a weld between the lip of the plastic base and the surface of the plastic housing.

2. The battery module of claim 1, wherein the bus bar is not welded to the terminal post.

3. The battery module of claim 1, wherein the terminal post comprises a base and a post extending from the base, wherein the bus bar comprises an opening and one or more flaps surrounding the opening, wherein the post of the terminal post extends through the opening of the bus bar, and wherein the one or more flaps of the bus bar are folded or wrapped around the base of the terminal post to retain the base within a pocket of the bus bar.

4. The battery module of claim 3, wherein the pocket of the bus bar and the base of the terminal post comprise a first combined cross-sectional area, wherein the plastic base comprises a second cross-sectional area, and wherein the second-cross sectional area is between 100% and 300% the size of the first combined cross-sectional area.

5. The battery module of claim 1, wherein the plastic base comprises an opening and the bus bar comprises an extension configured to extend through the opening to access the receptacle of the plastic housing.

6. The battery module of claim 5, wherein the receptacle of the plastic housing comprises an additional opening configured to receive the extension of the bus bar such that the extension extends into an interior of the plastic housing.

7. The battery module of claim 6, wherein the additional opening in the receptacle is configured to be aligned with the opening in the plastic base.

8. The battery module of claim 6, wherein the additional opening in the receptacle is configured to be offset from the opening in the plastic base, and wherein the extension comprises a curvature to enable the extension to extend through both the additional opening in the receptacle and the opening in the plastic base.

9. The battery module of claim 1, wherein the plastic base comprises a first tapered surface, wherein the receptacle comprise a second tapered surface compatible with the first tapered surface, and wherein the plastic base is disposed within the receptacle such that the first tapered surface is immediately adjacent the second tapered surface.

10. The battery module of claim 1, wherein the terminal post comprises a base and a post integral with the base.

11. The battery module of claim 1, wherein the terminal post comprises a threaded post, a smooth post, or a flange.

12. The battery module of claim 1, wherein the bus bar is configured to either directly or indirectly electrically couple the terminal post with a group of interconnected electrochemical cells disposed in an interior of the plastic housing.

13. A terminal block assembly configured to be disposed within a receptacle of a plastic housing of a battery module, the terminal block assembly comprising:
a plastic base; and
an electrical assembly overmolded by the plastic base, wherein the electrical assembly comprises a bus bar and a major terminal, wherein the major terminal comprises a base retained within a pocket defined at least in part by flaps of the bus bar folded around a perimeter of the base, and wherein the bus bar is not welded to the major terminal.

14. The terminal block assembly of claim 13, wherein the major terminal comprises a post extending from, and integral with, the base of the major terminal, and wherein the post extends through an opening in the bus bar.

15. The terminal block assembly of claim 13, wherein the plastic base of the terminal block assembly comprises a lip configured to be welded to a surface of the plastic housing surrounding the receptacle of the plastic housing.

16. The terminal block assembly of claim 13, wherein the plastic base of the terminal block assembly comprises a tapered surface configured to correspond with an additional tapered surface of the receptacle.

17. The terminal block assembly of claim 13, wherein the pocket of the bus bar and the base of the major terminal comprise a first combined cross-sectional area, wherein the plastic base comprises a second cross-sectional area, and wherein the second-cross sectional area is between 100% and 300% the size of the first combined cross-sectional area.

18. The terminal block assembly of claim 13, wherein the plastic base comprises an opening and the bus bar comprises an extension configured to extend through the opening to facilitate access by the extension of the receptacle of the plastic housing.

19. A battery module, comprising:
a terminal post assembly having a plastic base and an electrical assembly, wherein the electrical assembly is at least partially overmolded by the plastic base, wherein the plastic base is configured to be received within a receptacle of a plastic housing, wherein the electrical assembly comprises a terminal post and a bus bar, wherein the bus bar retains a base of the terminal post within a pocket of the bus bar, wherein the bus bar receives a post of the terminal post through an opening in the bus bar, and wherein the bus bar is not welded to the terminal post;
wherein the plastic base comprises an opening and the bus bar comprises an extension configured to extend through the opening to access the receptacle of the plastic housing.

20. The battery module of claim 19, comprising the plastic housing and the receptacle of the plastic housing, wherein the receptacle is defined at least in part by a first tapered surface, wherein the plastic base comprises a second tapered surface, and wherein the plastic base is disposed within the receptacle such that the second tapered surface is disposed immediately adjacent to the first tapered surface.

21. The battery module of claim 20, wherein the receptacle comprises an additional opening configured to receive the extension such that the extension extends into an interior of the plastic housing.

22. The battery module of claim 21, comprising a plurality of interconnected electrochemical cells disposed within the interior of the plastic housing, wherein the extension is configured to be electrically coupled with the plurality of interconnected electrochemical cells.

23. The battery module of claim 20, wherein the plastic housing comprises a surface surrounding the receptacle, and wherein the plastic base comprises a lip configured to be welded to, or sealed against, the surface surrounding the receptacle.

* * * * *